United States Patent [19]

Asahara et al.

[11] 4,108,621
[45] * Aug. 22, 1978

[54] PROCESS OF PRODUCING SOFT APERTURE FILTER

[75] Inventors: Yoshiyuki Asahara, Higashiyamato; Tetsuro Izumitani, Hino, both of Japan

[73] Assignee: Hoya Glass Works, Ltd., Tokyo

[*] Notice: The portion of the term of this patent subsequent to Dec. 27, 1994, has been disclaimed.

[21] Appl. No.: 751,300

[22] Filed: Dec. 16, 1976

[30] Foreign Application Priority Data

Dec. 19, 1975 [JP] Japan .................. 50/152251

[51] Int. Cl.$^2$ .............. C03C 15/00; C03B 11/08; C03C 19/00
[52] U.S. Cl. .................. 65/30 R; 65/33; 65/37; 65/60 C; 65/61; 106/52; 350/205; 350/319
[58] Field of Search .......... 65/30 E, 33, 30 R, 37, 65/61, 60 C; 350/205, 319; 106/52

[56] References Cited

U.S. PATENT DOCUMENTS

| | | | |
|---|---|---|---|
| 3,954,487 | 5/1976 | Gliemeroth et al. | 65/30 E |
| 4,022,628 | 5/1977 | Deeg | 65/30 E |

*Primary Examiner*—S. Leon Bashore
*Assistant Examiner*—Frank W. Miga
*Attorney, Agent, or Firm*—Sughrue, Rothwell, Mion, Zinn and Macpeak

[57] ABSTRACT

A process for producing a soft aperture filter having high acid and heat resistance as well as a desired colored layer thickness comprising heat-treating a glass, having a base composition of 55 to 72 mole percent $SiO_2$, 15 to 35 mole percent $Na_2O$, 0 to 5 percent divalent oxides other than ZnO, 4 to 15 mole percent ZnO, and 0 to 5 mole percent $Al_2O_3$ with $Sb_2O_3$ and/or $As_2O_3$ additionally present in an amount of 2 to 5 weight percent of the base composition, in a fused bath containing 14 to 60 mole percent of a silver salt, and optionally with $NaNO_3$ and/or $Na_2SO_4$.

6 Claims, 7 Drawing Figures

PROCESS OF PRODUCING SOFT APERTURE FILTER

BACKGROUND OF THE INVENTION

1. Field of the Invention

The present invention relates to a process of producing a glass for a soft aperture filter having a high thermal strength, and more particularly, the invention relates to a process of producing a glass for a soft aperture filter by utilizing the coloring due to silver diffused in the glass.

2. Description of the Prior Art

In general, strong focusing of light due to Fresnel diffraction at the edge of the cross section of the glass rod occurs at the center portion of the glass rod. In the case of using a laser glass, self focusing of the laser light in the laser glass occurs due to Fresnel diffraction, which results in an induction in breakage of the glass. In order to avoid such Fresnel diffraction, and prevent damage to the laser glass a soft aperture filter is used. The filter used for this purpose possesses such a function that it has a high transmission in a radius of $r_0$ and as the radius increases, the transmission decreases gradually until the radius increases to $r_1$ and the filter become non-transmissive of light when the radius becomes larger than $r_1$.

The inventors have discovered previously that a soft aperture filter used for the above purpose could be produced by diffusing a coloring element such as silver, etc., in a glass as described in Japanese Patent Application No. 34613/'75 (corresponding to U.S. patent application Ser. No. 668,999 filed Mar. 22, 1976). According to an embodiment disclosed in the above patent application, a glass body 1 having a projection 1' of a form as shown in FIG. 1-(a) and FIG. 1-(b) of the accompanying drawings is immersed in fused AgNO$_3$ contained in a vessel 2 as shown in FIG. 2 and is heat treated at a temperature near the transition point (Tg) of the glass, whereby the alkali ions in the glass are exchanged for the silver ion in the melt to cause a diffusion of the silver ion in the glass and to form a colored layer 4 of silver in the glass body 1 as shown in FIG. 3-(a). Then, by removing the projection 1' of the glass body, a glass body 1 having a colored layer portion 4, a portion 5 of which the color changes gradually, and an uncolored portion 6 as shown in FIG. 3-(b) is obtained. Finally, the colored bottom layer portion of the glass body is removed and the side surface thereof is polished to provide a soft aperture filter as shown in FIG. 3-(c).

In order to completely absorb light in the non-transmissive portion (the colored portion) of the soft aperture filter produced in the manner as described above, coloring by silver, etc., diffusion by ion exchange needs to be performed more effectively or the thickness of the colored layer portion formed by the diffusion of silver, etc. needs to be increased. As already stated in the specification of Japanese Patent Application No. 600061/'75 (corresponding to U.S. patent application Ser. No. 668,999 filed Mar. 22, 1976) to carry out more effectively coloring by silver, etc., by increasing the coloring efficiency per unit thickness of glass, a large amount of As$_2$O$_3$ and/or Sb$_2$O$_3$ must be added to the glass base. However, the thickness of the colored layer due to the silver formed in the glass body when the glass body is immersed in fused AgNO$_3$ is inversely proportional to the acid resistance of the glass and to increase the thickness of the colored silver layer in a glass body, a glass having a low acid resistance must be used as the glass body.

Also, in forming a colored layer on the surface of a glass by immersing the glass in a silver-containing melt, a process is used wherein the glass is maintained at a temperature which is lower than the decomposition temperature of the fused salt but at a temperature at which the fused salt is maintained in a liquid state to exchange the readily soluble components (alkali ions, etc.,) in the glass for the silver ion and then the glass is heat treated again at a higher temperature to color the silver ion. However, in the production of the soft aperture filter as described above, the formation of a quite thick, colored layer of about 1 to 2 mm thick is required and for this purpose a large amount of silver must be incorporated into the glass by heat treatment of the glass at a high temperature near the transition point of the glass. However, since the decomposition temperature of AgNO$_3$ is lower than 400° to 500° C., which is the transition point (Tg) of an alkali silicate glass used as the base glass for a soft aperture filter, the AgNO$_3$ is decomposed as a result in the heat treatment at high temperature and the silver incorporation efficiency in the glass is very low.

SUMMARY OF THE INVENTION

An object of this invention is to provide a process of producing a soft aperture filter having a high acid resistance and heat resistance and also having a desired thickness of a colored layer of silver using an ion-exchange diffusion of silver ion in a fused silver salt which is un-accompanied by the above described difficulties.

Another object of this invention is to provide a soft aperture filter having excellent properties produced by the process of this invention.

As the result of various investigations, it has now been discovered that in producing a soft aperture filter the use of a silicate glass containing alkali components as the base glass to improve the ion exchange efficiency with silver ion and to facilitate the diffusion of the silver ion and the use of ZnO as a di-valent component additionally present in the base glass to improve the acid resistance of the glass provide a soft aperture filter having excellent acid resistance and a thick colored layer of silver.

It has further been found that in producing a soft aperture filter having a colored layer on the surface of the above-described glass by immersing the glass in a fused bath containing AgNO$_3$, AgCl or Ag$_2$SO$_4$, the thickness of the colored layer formed on the surface of the glass can be increased by additionally using a fused sodium salt, such as fused NaNO$_3$, fused Na$_2$SO$_4$, etc., in the fused bath.

That is, this invention provides a process of producing a soft aperture filter, utilizing the coloring of silver diffused in a glass, which comprises treating a glass in a fused bath containing 14 to 60 mole percent silver salt, in which the glass has a base composition of 55 to 72 mole percent SiO$_2$, 15 to 35 mole percent Na$_2$O, 0 to 5 mole percent di-valent oxides other than ZnO, e.g., MgO, SrO, CaO and BaO, 4 to 15 mole percent ZnO, and 0 to 5 mole percent Al$_2$O$_3$ in which at least one of Sb$_2$O$_3$ and As$_2$O$_3$ in an amount of 2 to 5 weight percent of the base composition is added to the base glass.

In another embodiment of the process of this invention, this invention provides a process for producing a soft aperture filter by immersing a glass having the above-described composition together with the additional component in a fused salt containing a silver salt together with at least one of $NaNO_3$ and $Na_2SO_4$.

DETAILED DESCRIPTION OF THE INVENTION

Examples of this invention are illustrated in the following tables together with comparison examples and the features of this invention will be explained by reference to the following tables. In the examples set forth below, raw materials for the components recited were mixed and melted at a temperature of 1,300° to 1,450° C for about 30 minutes, and then poured into an aluminum crucible. The glass was then cooled to the transition temperature of the glass and then further cooled at a set cooling rate to produce the glass subjected to the heat treatment set forth in the table below.

glass articles is expressed as the reduction in weight percent after immersing a powder of the glass in a 0.01 N solution of $HNO_3$ for 1 hour at 99° C.

Figure 1A:
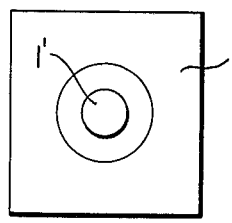
FIG. 1-(a) and 1-(b) are a plane view and a side view, respectively, of a glass body for making a soft aperture filter.
Figure 3A:
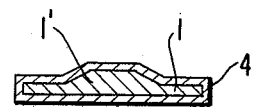
FIG. 3-(a), 3-(b), and 3-(c) are sectional views showing the steps of producing a soft aperture filter from the colored glass body.
Figure 1B:
Figure 3B:
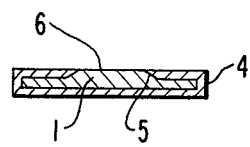
Figure 2:
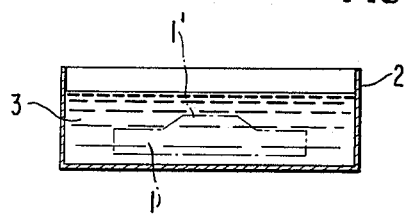
FIG. 2 is a schematic sectional view showing the manner of coloring the glass body shown above by silver.
Figure 3C:
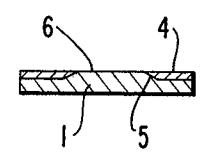
Figure 4:
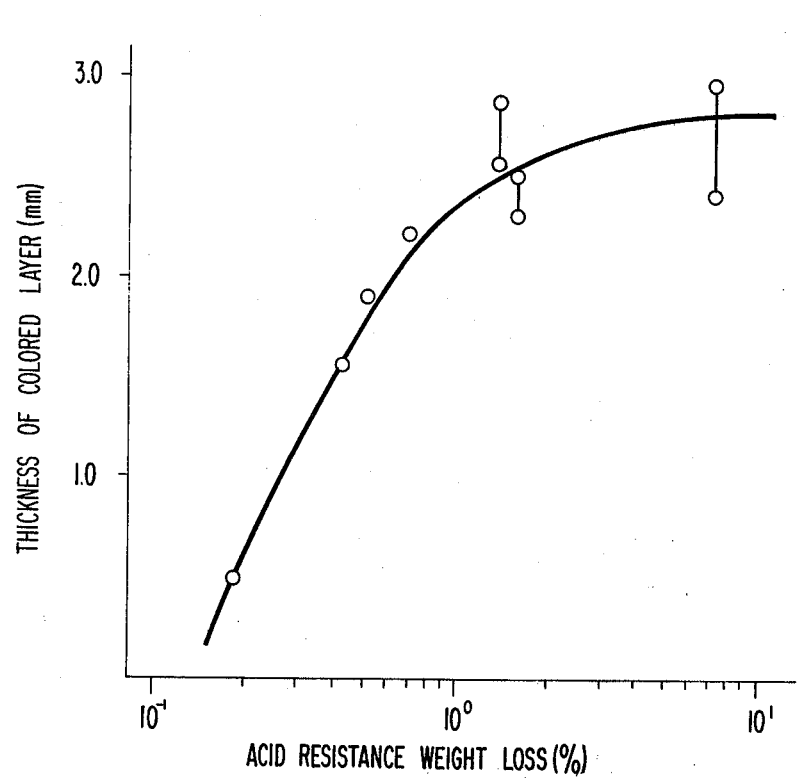
FIG. 4 is a graph showing the relation between the acid resistance of the glass and the thickness of the colored silver layer formed on the glass in the examples of this invention.

In the examples and the comparison examples shown in the above tables, the thickness of the colored layers formed in the using various oxides as the di-valent component RO are comparatively shown and the relationship of the thickness of the colored layer and the acid resistance is shown in FIG. 4. As is shown in the results of FIG. 4, the acid resistance weight loss is proportional to the thickness of the colored layer in the glass containing the components other than ZnO, while only in the glasses containing ZnO is the thickness of the colored layer more than 3.00 mm. thick in spite of the low acid resistance weight loss as shown in Test No. 5. Furthermore, the colored layer is thicker in Example 10 than in Comparison Example 9 and also is thicker in Examples 13 and 14 than in Comparison Example 12. Thus, it can be understood that by using a glass containing ZnO, the period of time required for finishing the heat treatment for forming the colored layer can be reduced and also soft aperture filters having excellent acid resistance can be obtained.

Table 2 shows the results obtained by heat treating glass pieces, each having a composition of 30 mole% $Na_2O$, 10 mole% CaO and 60 mole% $SiO_2$ in which 4% by weight $Sb_2O_3$ has been added in a fused bath containing specific salts at a particular ratio and then measuring the thickness of the colored layer formed on the glass surface and the optical density per unit thickness of the colored layer. As is shown by the results in the table, the Table 1

| No. | Composition (mole %) | | | | Thickness of Colored Layer (mm.) | Heat Treatment Conditions | | Fused Bath | |
|---|---|---|---|---|---|---|---|---|---|
| | $SiO_2$ | $Na_2O$ | RO | $Al_2O_3$ | | Temperature | Time | $AgNO_3$ | $NaNO_3$ |
| 1 | 60 | 30 | 10 CaO | — | 2.20 | 480° C. | 18 hours | 1 | 0 |
| 2 | 60 | 30 | 10 MgO | — | 2.30–2.50 | 480° C. | 18 hours | 1 | 0 |
| 3 | 60 | 30 | 10 BaO | — | 2.40–2.95 | 480° C. | 18 hours | 1 | 0 |
| 4 | 60 | 30 | 10 SrO | — | 2.55–2.85 | 480° C. | 18 hours | 1 | 0 |
| 5* | 60 | 30 | 10 ZnO | — | more than 3.00 | 480° C. | 18 hours | 1 | 0 |
| 6 | 58 | 30 | 10 CaO | 2 | 1.90 | 480° C. | 18 hours | 1 | 0 |
| 7 | 70 | 20 | 10 CaO | — | 0.50 | 480° C. | 18 hours | 1 | 0 |
| 8 | 56 | 30 | 10 CaO | 4 | 1.55 | 480° C. | 18 hours | 1 | 0 |
| 9 | 60 | 30 | 10 CaO | — | 0.75 | 460° C. | 6 hours | 1 | 3 |
| 10* | 60 | 30 | 10 ZnO | — | 1.20 | 460° C. | 6 hours | 1 | 3 |
| 11 | 58 | 30 | 10 CaO | 2 | 0.90 | 460° C. | 6 hours | 1 | 3 |
| 12 | 70 | 20 | 10 CaO | — | 0.25 | 460° C. | 6 hours | 1 | 3 |
| 13* | 68 | 20 | 5ZnO, 5CaO | 2 | 0.40 | 460° C. | 6 hours | 1 | 3 |
| 14* | 63 | 25 | 10 ZnO | 2 | 0.80 | 460° C. | 6 hours | 1 | 3 |
| 15* | 68 | 20 | 10 ZnO | 2 | 0.55 | 460° C. | 6 hours | 1 | 3 |
| 16* | 58 | 30 | 10 ZnO | 2 | 0.90 | 460° C. | 6 hours | 1 | 3 |

*Invention
(note)Each of the glass compositions shown above contained 4% by weight $Sb_2O_3$ additionally.

Table 2

| No. | Composition of Fused Bath (mole %) | | | | Heat Treatment Conditions | | Thickness of Colored Layer (mm.) | Optical Density of the Colored Layer per Unit Thickness (1.06 μ) (mm$^{-1}$) |
|---|---|---|---|---|---|---|---|---|
| | $AgNO_3$ | $Ag_2SO_4$ | $NaNO_3$ | $Na_2SO_4$ | Temperature | Time (hr.) | | |
| 1 | 100 | — | — | — | 460° C. | 24 | 1.0 | — |
| 2 | 25 | — | 75 | — | 460° C. | 24 | 1.7–1.9 | — |
| 3 | 100 | — | — | — | 460° C. | 6 | 0.45–0.50 | 6.8 |
| 4 | 50 | — | 50 | — | 460° C. | 6 | 0.75 | 12.4 |
| 5 | 25 | — | 75 | — | 460° C. | 6 | 0.70 | 12.6 |
| 6 | 40 | — | — | 60 | 460° C. | 6 | 0.70 | 19.2 |
| 7 | — | 14.3 | 85.7 | — | 460° C. | 6 | 0.85 | — |

In the results of the examples and the comparison examples shown in the above tables, the thickness of the colored layer of silver was measured after heat treating the glass piece having the specific composition shown in a fused bath of $AgNO_3$ or a mixture of $AgNO_3$ and $NaNO_3$ and then polishing a cross section of the glass piece thus heat treated. Also, the acid resistance of the thickness of the colored layer obtained using the fused bath containing the sodium salt (Test Nos. 2 and 4–7) is about 1.5 to 2 times larger than that in Comparison Examples 1 and 3 in which $AgNO_3$ only was used and also the optical density of the colored layer per unit thickness in the former case is about 2 to 3 times larger than the latter case.

Accordingly, by using the fused salt bath of this invention, the amount of silver salt such as AgNO$_3$ which is consumed in the step of forming the colored layer can be reduced and a colored layer having an excellent light absorption efficiency can be formed. Thus, the process of this invention is effective for forming the colored layer in the production of soft aperture filters and can be effectively utilized in forming a colored layer on the surface of an ordinary glass article.

In the mixing ratio or the composition of the fused bath used in this invention, the proportion of the silver salt which must be present is higher than a specific value or higher than 14 mole percent for diffusing a large proportion of silver into the glass. On the other hand, if the proportion of the silver salt is too large, the effect of the silver salt is decreased and thus the amount of the silver salt must be lower than 60 mole percent. Suitable examples of silver salts which can be used include AgNO$_3$, Ag$_2$SO$_4$ and AgCl.

Furthermore, Na$_2$O in the glass used in this invention is a component necessary for diffusing silver in the glass due to the exchange reaction with the silver ion in the fused bath and if the amount of Na$_2$O is less than 15 mole percent, the amount of the silver ions which can diffuse into the glass is less, while if the amount of Na$_2$O is larger than 35 mole percent, the acid resistance of the glass decreases. If SiO$_2$ in the glass used in this invention is less than 55 mole percent, the acid resistance of the glass becomes quite poor, while if the amount of SiO$_2$ is larger than 72 mole percent, the melting point of the glass increases making the melting of the glass difficult. Further the proportion of Na$_2$O decreases as the result of the increase in the proportion of SiO$_2$, which results in decreasing the amount of silver ion diffused in the glass. Also, if the amount of ZnO is less than 4 mole percent, the advantages of this invention cannot be obtained while if the amount of ZnO is larger than 15 mole percent, the relative amount of Na$_2$O decreases with an undesirable result of reducing the amount of silver ion diffused. Furthermore, Al$_2$O$_3$ is a component for improving the acid resistance of the glass but if the amount of Al$_2$O$_3$ is larger than 5 mole percent, the melting point of the glass is increased. Furthermore, Sb$_2$O$_3$ and/or As$_2$O$_3$ is a component necessary for coloring the silver ion diffused due to ion exchange but if the amount of the component added is larger than 5% by weight, a desirable effect is not obtained and hence the addition of such a large amount of the component is meaningless.

The glasses used in this invention as a starting material can be prepared by melting the components (generally oxides or salts thereof) at 1300° to 1,450° C for up to 6 hrs., generally 5 to 6 hrs. on a large scale in an aluminum crucible, cooling to the transition temperature of the glass, and then further cooling to room temperature at a set cooling rate. This glass is then treated in the process of this invention as described hereinbefore in detail.

The fused bath used in this invention can also contain nitrates, sulfates and chlorides of Na, K and Li in addition to the components recited above (e.g., the silver salt and the Na NO$_3$ and/or the Na$_2$SO$_4$). The heat treatment of the glass in the fused bath in the process of this invention can be at a temperature of 440° C to 500° C for about 1 to 24 hours.

Thus, by treating a glass having the above described composition in a fused bath having the composition as defined in this invention, the desired silver diffusion effect and coloring effect are obtained.

While the invention has been described in detail and with reference to specific embodiments thereof, it will be apparent to one skilled in the art that various changes and modifications can be made therein without departing from the spirit and scope thereof.

What is claimed is:

1. A method for producing a soft edged aperture filter to prevent Fresnel diffraction at the edge of a glass rod which comprises
    a. diffusing silver into a glass plate having a base composition comprising
        i. 55 to 72 mole percent SiO$_2$,
        ii. 15 to 35 mole percent Na$_2$O,
        iii. 0 to 5 mole percent divalent oxide or oxides other than ZnO,
        iv. 4 to 15 mole percent ZnO,
        v. 0 to 5 mole percent Al$_2$O$_3$, and
        vi. at least one of Sb$_2$O$_3$ and As$_2$O$_3$ in an amount of 2 to 5 weight percent of the base composition
    with a fused bath containing at least one silver salt in an amount of 14 to 60 mole percent, said glass plate having on a first surface thereof a glass projection portion which does not extend to any side of the glass plate, wherein said diffusion is into the projection and into said first surface and bottom surface of the plate, and subsequently
    b. removing said glass projection portion down to said first surface having said diffused silver without disturbing said first surface and removing the diffused bottom surface, to thereby provide a light transmittance gradient arranged in a circle on the glass plate, the gradient being a lowering of the light transmittance between the first and bottom surfaces of the glass plate in the radial direction from the inner to the outer portion of the circle.

2. The method of claim 1, wherein said silver salt in the fused bath is AgNo$_3$, Ag$_2$SO$_4$ or AgCl.

3. The method of claim 1, wherein said fused bath additionally contains at least one of NaNO$_3$ and Na$_2$SO$_4$.

4. The method of claim 1, wherein said fused bath contains one or more nitrates, sulfates and chlorides of sodium, potassium and lithium.

5. The method of claim 1, wherein said diffusing step a) is at a temperature of 440° C to 500° C. for about 1 to 24 hours.

6. The method of claim 1, wherein said divalent oxide or oxides other than ZnO are selected from the group consisting of MgO, SrO, CaO and BaO.

* * * * *